United States Patent [19]
Savage

[11] Patent Number: 5,365,059
[45] Date of Patent: Nov. 15, 1994

[54] PARALLEL BEAM FORCE MEASUREMENT APPARATUS HAVING AN OPTICAL LIGHT SENSOR MEANS

[75] Inventor: Donald V. Savage, San Jose, Calif.

[73] Assignee: Bilanx Technology, Inc., Cupertino, Calif.

[21] Appl. No.: 102,465

[22] Filed: Aug. 6, 1993

[51] Int. Cl.⁵ .............................. G01D 5/34
[52] U.S. Cl. .................. 250/231.1; 356/32; 73/800; 73/862.624
[58] Field of Search ............... 250/231.1, 231.16, 238; 73/800, 812, 813, 814, 854, 862.624; 356/32, 34, 35.5

[56] References Cited

U.S. PATENT DOCUMENTS

| | | | |
|---|---|---|---|
| 3,229,511 | 1/1966 | Rossire | 73/88.5 |
| 3,421,594 | 1/1969 | Hino | 177/223 |
| 3,423,597 | 1/1969 | Delp | 250/231 |
| 3,805,907 | 4/1974 | Knothe et al. | 177/210 |
| 3,913,563 | 10/1975 | Ball | 128/2 S |
| 3,969,934 | 7/1976 | Raskin | 73/862.624 |
| 4,263,810 | 4/1981 | Chiu | 73/800 |
| 4,275,599 | 6/1981 | Kohlenberger et al. | 73/774 |
| 4,625,819 | 12/1986 | O'Neill | 177/212 |
| 4,825,069 | 4/1989 | Hutchisson et al. | 250/229 |
| 5,298,964 | 3/1994 | Nelson et al. | 73/800 |

*Primary Examiner*—David C. Nelms
*Assistant Examiner*—Que T. Le
*Attorney, Agent, or Firm*—John J. Leavitt

[57] ABSTRACT

Presented is a strain measurement transducer incorporating a load-beam subject to deflection when a load is applied, and a non-load-bearing beam mounted on the load beam in a manner to preclude displacement of the non-load-bearing beam when the load beam is displaced. A source of light is mounted on the non-load-bearing beam, cooperating with an optical mask, to project a beam of light energy which impinges onto a set of multiple photodiodes in proportion to the degree of displacement of the photodiodes with the load-bearing beam in relation to the stationary source of the light energy. The photodiodes transmit electrical signals proportional to the degree of illumination to an electronic circuit that processes the signals and indicates the magnitude of the load imposed on the load beam, or indicates its deflection in a selected unit of measurement.

19 Claims, 8 Drawing Sheets

PARALLEL BEAM FORCE MEASUREMENT APPARATUS HAVING AN OPTICAL LIGHT SENSOR MEANS

BACKGROUND OF THE INVENTION

1. Field of the Invention

The invention relates to load or applied force measuring devices, and particularly to a parallel beam system for measuring the displacement of one beam in relation to a stable beam.

2. Description of the Prior Art

Measurement of applied forces and loads are often made with load cells of various configurations that are implemented with bonded metal foil or semiconductor strain gauges. This is a well-developed technology and works very well in many applications. A necessary characteristic of strain gauges is that they be tightly bonded to the load cell mechanisms with a very thin, hard, glue line. They also must be bonded to the load cell in a high stress field (large strain) for adequate sensitivity.

In dynamic loading applications such as are found in "on board" weight scale systems for trucks, forklifts and other material handling equipment, strain gauge systems have exhibited poor reliability. This is due to failure of the hard bonding material under the continual high-stress flexure of the load cells.

Optical position-sensing systems using photodiodes and other light sensitive devices are also well documented in the literature. Several systems and load cells have been proposed that employ these optical devices to measure relative displacement of mechanical parts of the system through generation of electrical signals that are analogs of the load or force applied to the system or load cell. While these embodiments do not suffer from high stress fatigue as do the strain gauges, their displacements are all or in part angular and exhibit $\sin\Theta$ or $\cos\Theta$ errors. These optical systems also do not adequately address mechanical temperature coefficients of expansion and contraction because the mechanisms are not symmetrical.

Accordingly, it is one of the objects of the present invention to provide a parallel beam sensor apparatus that measures displacement of one beam in relation to another without exhibiting $\sin\Theta$ or $\cos\Theta$ errors.

Another object of the invention is to provide a parallel beam sensor apparatus in which parallel beams are mechanically interconnected in a manner to enable deflection of one beam without deflection of the other beam.

A still further object of the invention is the provision of a parallel beam sensor apparatus in which one of the beams is a load bearing beam that exhibits deflection in response to the application of force transverse to the long dimension of the load bearing beam and the other beam constitutes a stable plane of reference beam that does not move with the load bearing beam.

Yet another object of the invention is the provision of a parallel beam sensor apparatus in which corresponding ends of the parallel beams are interconnected in such a manner that a light source and slotted mask on one beam cooperate with light sensitive photodiodes on the other beam to measure and display the degree of relative transverse motion of one beam in relation to the other.

A further object of the invention is the provision of a parallel beam sensor apparatus that is a combination of mechanical and optical components configured to measure and display or record the relative transverse displacement of a load-bearing beam in relation to a non-load bearing beam by generation of an electrical current that is a linear analog of the load or force applied to the load-bearing beam.

The invention possesses other objects and features of advantage, some of which, with the foregoing, will be apparent from the following description and the drawings. It is to be understood however that the invention is not limited to the embodiment illustrated and described since it may be embodied in other forms within the scope of the appended claims.

SUMMARY OF THE INVENTION

The present invention is a strain measurement transducer that is a combination of optical, electrical and mechanical elements connected together to provide a linear electrical analog of a weight load (force) applied to the transducer. Structurally, the invention comprises two beams positioned parallel to each other and attached together at their corresponding ends by weak torsion bars. The first beam is a heavy load-bearing member and the second beam is an unloaded "outrigger" type beam that only undergoes stresses transmitted to it through the weak torsion bars. The torsion bars impose a small couple at each end of the parallel beam. The parallel beam is designed to be rigid in the plane of the couples and therefore exhibits no or negligible movement. In use, the first beam is transversely loaded at its center and supported at opposite ends. The loaded beam is deflected linearly as a function of the load, while the unloaded parallel second beam remains stationary. Electro-optical components mounted on the loaded beam as well as on the unloaded beam sense the relative motion between them and generate an electrical signal that is an analog of the weight load (force) applied to the first beam. This signal is then converted to digital form for a visual digital display and digital signal processing. The associated electronic circuitry is a balanced and temperature compensated differential amplifier system that operates only cn differential signals and is, therefore, not affected by generally common ambient temperature variations. Electronic circuits are provided in a unique negative feed-back configuration to control the temperature-induced variations in the electro-optical components, as well as variations in the mechanical components.

DESCRIPTION OF THE PREFERRED EMBODIMENTS

Figure 1:
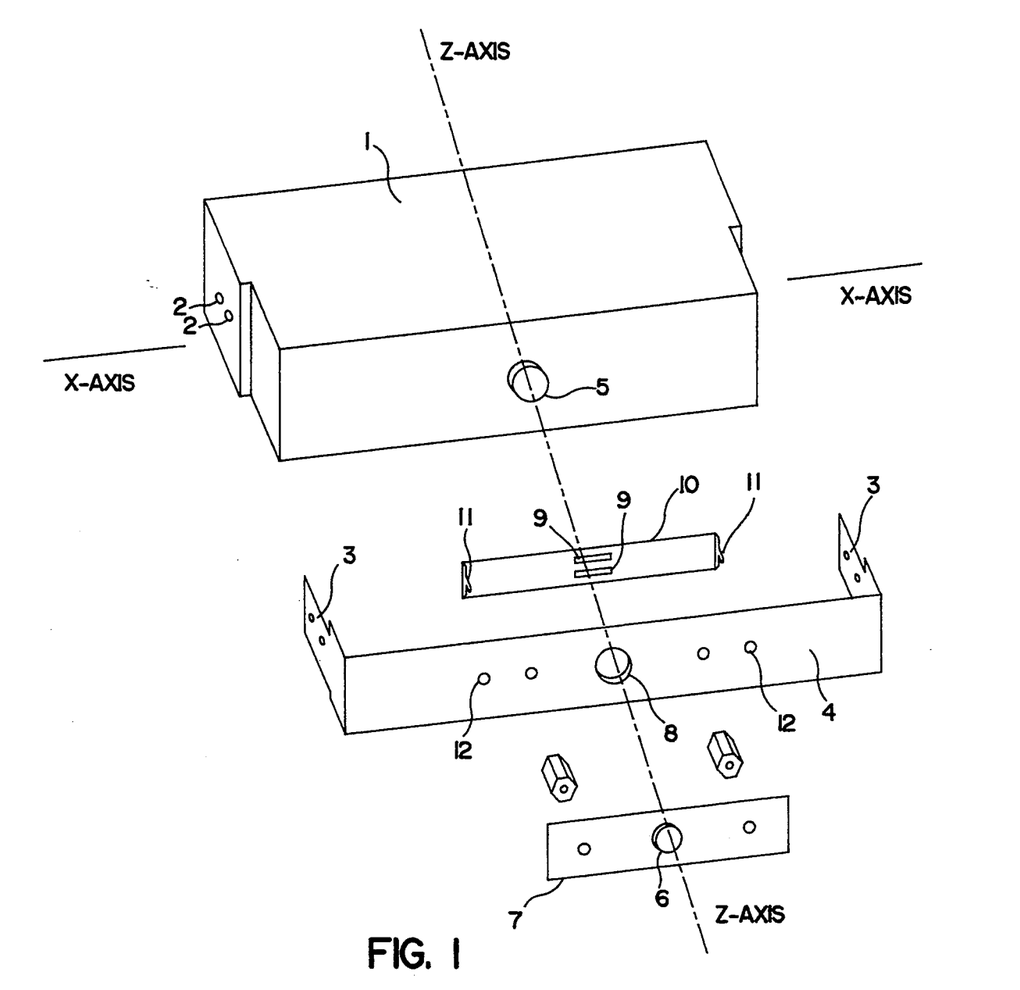
FIG. 1 is an exploded perspective view of the components of the parallel beam sensor configured as a stand-alone load cell transducer.

In terms of greater detail, FIG. 1 illustrates in exploded form how the components of the parallel-beam system of my invention are positioned relative to each other in a preferred embodiment as a stand-alone article of manufacture in the form of a weight load cell, force sensor, or tranducer. The load-bearing beam designated generally by the numeral 1 is configured as an elongated rectangular monolithic metal bar having upper and Lower surfaces with threaded holes 2 at each opposite end so that the thin and narrowed torsion bar sections 3 of parallel beam 4 may be attached to opposite ends of the beam 1 with machine screws. A set 5 of four optically-sensitive photodiodes (FIG. 5) is mounted on the neutral Z-axis of the load-bearing beam as shown so as to be subjected to negligible stresses when the load-bearing beam is subjected to stress. An optical energy source in the form of a light emitting diode (LED) 6 is mounted on plate 7, which is in turn mounted on parallel beam 4. A hole 8 is provided in parallel beam 4 centered between opposite ends to allow the light energy to pass through it. Two aperture slots 9 are provided in optical mask 10 which is attached to parallel beam 4 on the side opposite the plate 7 with tabs 11 fixed in holes 12 formed in the beam 4 so that the slots 9 are symmetrically arranged on opposite sides of the neutral axis. In this configuration, light energy from the LED 6 is transmitted through hole 8, through aperture slots 9, and onto optical sensor 5.

Figure 5:
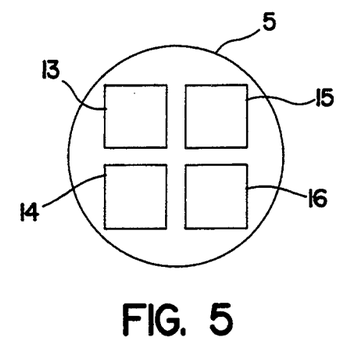
FIG. 5 illustrates diagrammatically the physical layout of photodiodes on the substrate that make up the diode mounted on the load-bearing beam.

The configuration of diode set 5 is shown in FIG. 5. The four separate diodes 13, 14, 15 and 16 are deposited on a flat substrate and are therefore coplanar. They are deposited on the substrate at the same time and made from the same semiconductor batch material. In this way, the diode characteristics may be closely matched, which is desirable for easier control of the force sensor. They are in close proximity on the substrate so temperature differentials between them will be negligible and each diode will normally receive equal light energy from LED 6 when the load beam is unstressed. These characteristics are required for proper operation of the force sensor.

Figure 6:
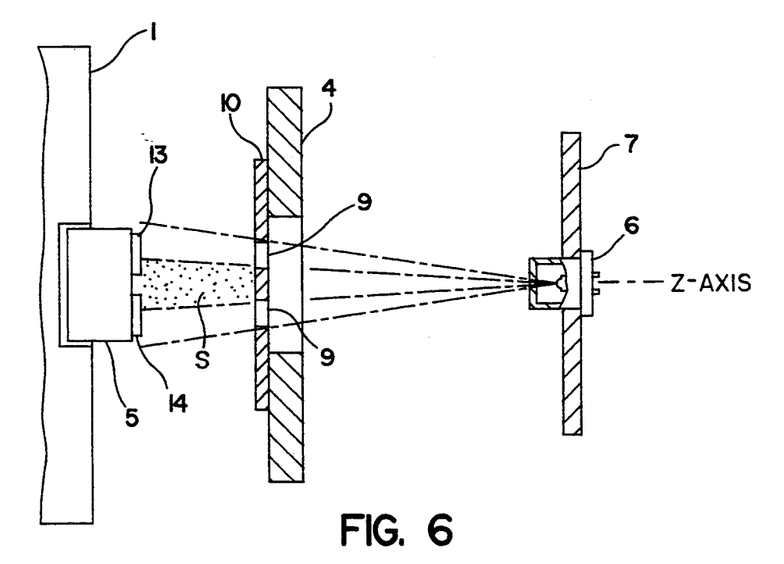
FIG. 6 is a vertical cross-sectional view taken in the plane indicated by the line 6—6 of FIG. 2, to show the relationship between the LED, optical mask and optical sensor.

FIG. 6 is a sectional view of the optical mask 10, illustrating its position relative to the LED 6 and photodiode sensors 13, 14, 15 and 16. Since the photodiodes are coplanar, only the near upper photodiode 13 and the near lower photodiode 14 can be seen in this view. However, far upper photodiode 15 and far lower photodiode 16 are in the same position relative to the optical mask 10 and the, LED 6, as are the diodes shown.

Figure 7:
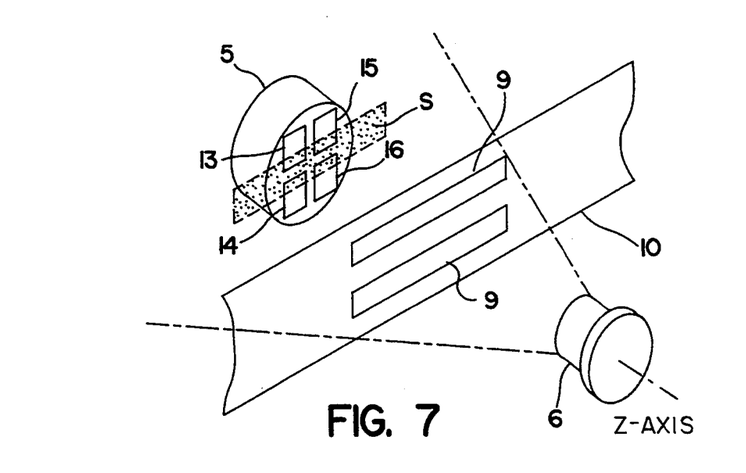
FIG. 7 is a schematic representation of the spatial relationship between the LED, the optical mask and the photodiode.

Light energy from the LED 6 transmitted through aperture slots 9 is directed to upper diodes 13 and 15 and lower diodes 14 and 16 (FIG. 7). Each diode of the sensor is partially in the shadow S of the strip section between the aperture slots. The electrical current output of the photodiodes is directly proportional to the light intensity received from LED 6 and the area of the diodes that is illuminated. The light intensity is maintained at a constant level so that the current output from the diodes is strictly proportional to their illuminated area.

Figure 2:
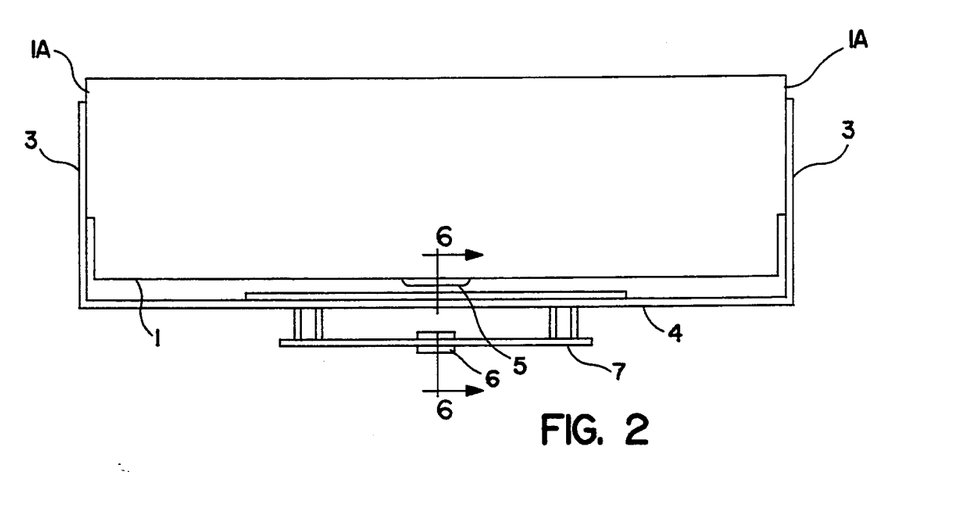
FIG. 2 is a plan view of the assembled load cell transducer taken in the direction of an applied force.
Figures 10, 11, 12:
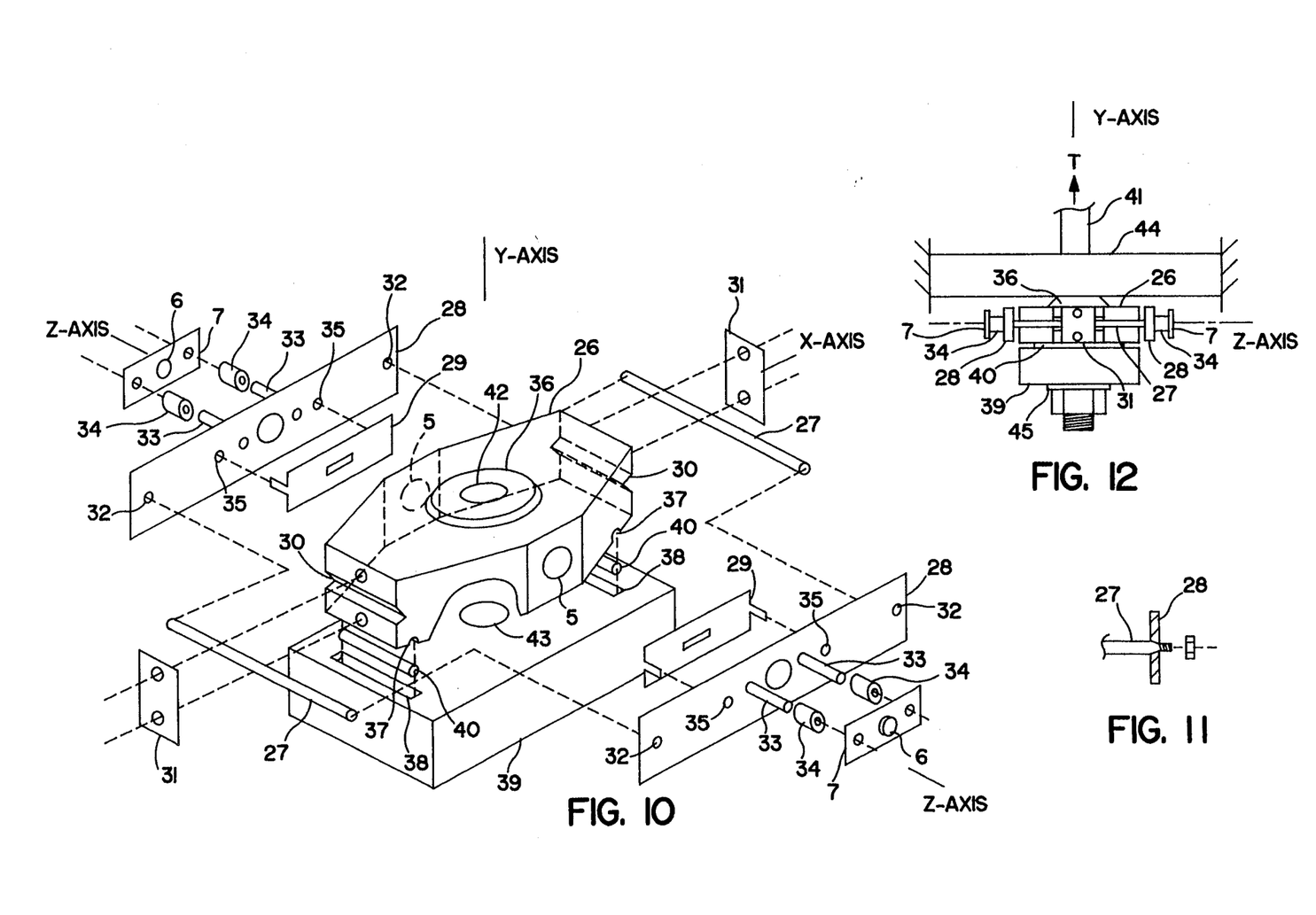
FIG. 10 is an exploded perspective view of a second embodiment of the stand-alone load cell transducer incorporating two load bearing beams.
FIG. 11 is a fragmentary elevational view partly in section illustrating the interconnection of the torsion bars of FIG. 10 to the associated end portions of the parallel beams.
FIG. 12 is an elevational view illustrating an installation of the apparatus of FIG. 10 in assembled form to determine tension in a cable.

FIG. 2 illustrates a plan view of the assembled parallel beam transducer of FIG. 1 looking in the direction of the force applied to load-bearing beam 1. For simplicity, only one parallel beam 4 is shown. Sensitivity of the transducer can be increased by adding a second parallel beam and set of sensors on the other side of beam 1, opposite parallel beam 4 as illustrated in FIG. 10. The concept and explanation would not be changed. FIG. 2 shows typical proximity of the beams and optical components when the trasnducer is assembled. After assembly, the transducer is placed in a light-tight protective steel box (not shown) with the box cover fitted with an appropriate rubber boot (not shown) to allow unimpeded application of the load to beam 1.

Figure 3:
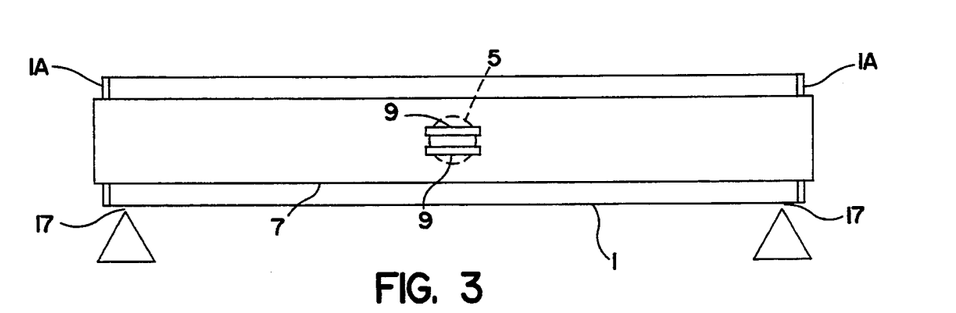
FIG. 3 is a front elevational view of the load cell transducer illustrating the relative position of the load-bearing beam to the parallel beam, and the relative position of the aperture slots to the optical sensor with no load applied to the load-bearing beam.

FIG. 3 is a front elevational view of the partially assembled transducer shown supported at opposite ends and with no weight load applied to beam 1. This view shows that the aperture mask 10 and the diode set 5 are aligned such that the output from all the photodiodes is equal when no load is imposed on the beam. LED 6 and mounting plate 7 are not shown in this view.

Figure 4:
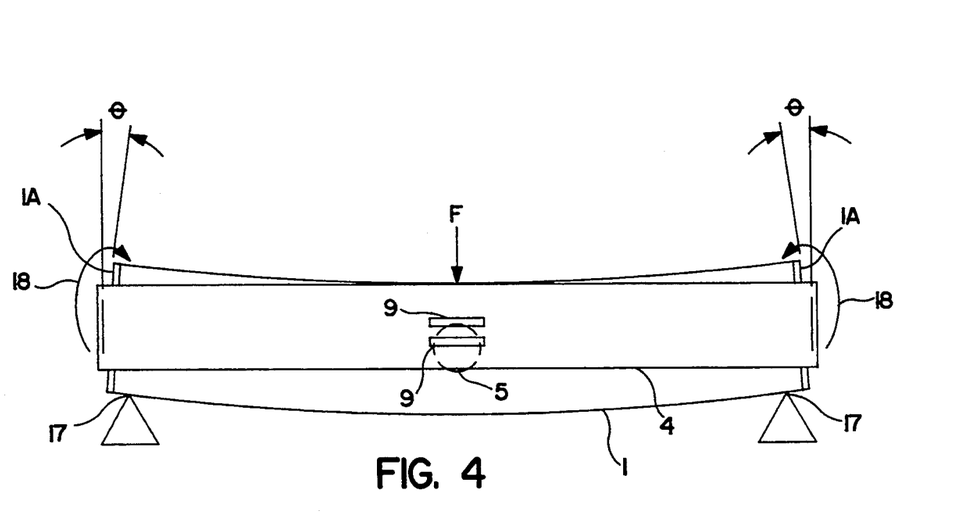
FIG. 4 is a front elevational view of the load cell transducer similar to FIG. 3, but illustrating diagrammatically the relative position of the load bearing beam to the parallel beam, and the relative position of the aperture slots to the optical sensor with a load applied to the load-bearing beam.

FIG. 4 is a front elevational view similar to FIG. 3, but illustrating the transducer with a load applied to beam 1 in the direction indicated by the force vector F extending in the direction of the Y-axis. The load is applied in the center of beam 1 between support points 17. The deflection in beam 1 as shown is exaggerated to illustrate its function. The end surfaces 1A of the load beam 1 are not stressed but are deflected through a small angle $\ominus$ as shown. The torsion bar sections 3 of parallel beam 4 are attached to surfaces 1A, centered on beam 1 with respect to the X-axis. In this configuration, torsion bar sections 3 of parallel beam 4, being thin and narrow, are subjected only to very small torsional stresses. Torsion bar sections 3 are designed with very small cross-section so they are very flexible in torsion and transmit only a weak couple 18 to parallel beam 4, the couple being insufficient to alter the stable position of parallel beam 4 in relation to the associated face of the load beam 1. Parallel beam 4 is designed to have a high cross-sectional moment of inertia about the Z-axis and thus a high resistance to bending as a result of the weak couple. The bending of beam 1 in the Y direction thus only causes negligible if any bending of beam 4 in the Y direction. The exaggerated drawing of FIG. 4 thus shows how the relative movement of sensor 5 and mask 10 is accomplished. Support points 17 may be moved inward toward the center application point of force F. As the support points 17 are moved toward the application point of force F, surfaces 1A exhibit an angular deflection as well as a linear transposition in the direction opposite the direction of force F. As surfaces 1A are thus linearly transposed, so is parallel beam 4 so transposed. This transposition enhances the relative movement between optical sensor 5 and aperture mask 10 which then increases the sensitivity of the system.

FIG. 10 shows the aperture mask 29 modified to a single slot configuration. The light energy from the LED is transmitted through the slot and is thus controlled by the dimensions of the slot. The slot is designed to partially illuminate the upper and lower photodiodes so that the ratio of illuminated area to shadowed area causes the diodes to output a current that is a function of the position of the diodes relative to the slot. The single slot of aperture mask 29 thus performs a function similar to the dual slot configuration of aperture mask 10 but with the shadowed and illuminated areas of photodiode set 5 reversed. Because of the symmetry of photodiode set 5, its function is not changed. This configuration can be set up to accommodate different photosensor configurations as well as different relative positions of the photosensors, the mask and the LED light source. The slot can also be modified into a round hole, a rectangular hole, a triangular hole or any other irregular shape to achieve linearity or nonlinearity responses to compensate for mechanical aberations or any special function desired.

Figure 9:
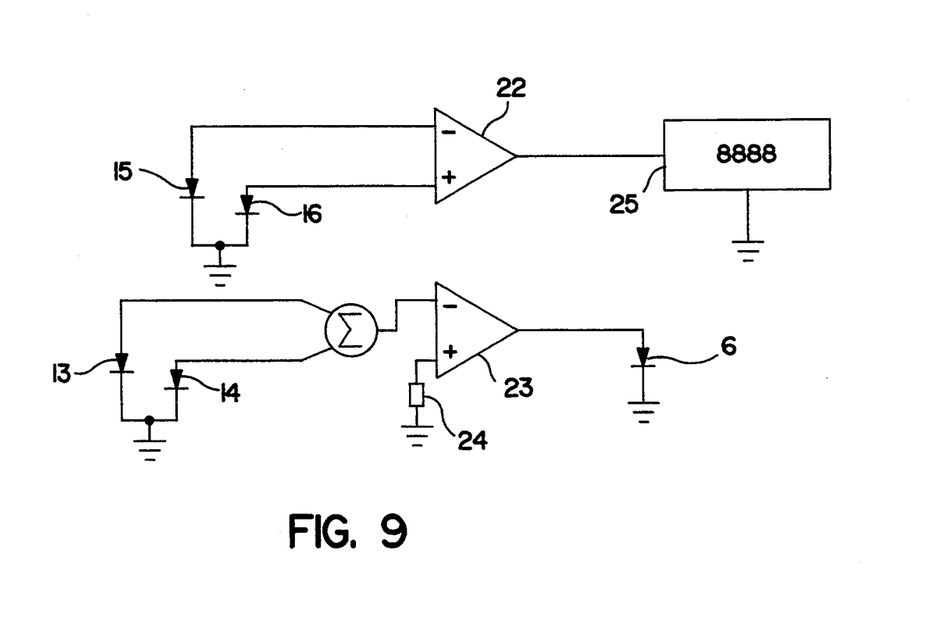
FIG. 9 is a schematic diagram of the electrical connections between the photodiodes, the LED, and the electronic circuits.

FIG. 9 shows the electrical circuits that operate with the photodiode sensors and the LED light source. Upper photodiode 15 is connected to the inverting input of differential amplifier 22 and lower photodiode 16 is connected to the non-inverting input of differential amplifier 22. Upper photodiode 3 and lower photodiode 14 are both connected into the summing input of amplifier 23.

The XYZ (Cartesian) coordinates are shown in figures where appropriate to illustrate the relative movement sensitivities of the system. When the four-diode set 5 is moved along the Y-axis in the negative direction relative to the optical mask 10, the illuminated area of upper diodes 13 and 15 is decreased in the exact amount that the illuminated area of the lower diodes 14 and 16 is increased. The outputs from these diodes, therefore, change equally but oppositely.

Since the output of diode 15 and diode 16 are connected to opposite inputs of differential amplifier 22, the resulting output change of amplifier 22 is a directly proportional and linear electrical analog of the negative Y-axis displacement of diode set 5 and therefore an analog indication of the load imposed on beam 1.

The outputs of diode 13 and diode 14 are connected to the input of summing amplifier 23 and these diode outputs change equally but oppositely so the sum of the outputs is not changed and the output of amplifier 23 does not change as a function of Y-axis movements of diode set 5.

When the diode set 5 is moved along the Y-axis in the positive direction relative to the optical mask 10, all diode-illuminated area changes are reversed from those that were caused by the negative Y-axis direction of movement. Since the diode set 5 and the optical mask 10 are symmetrical about the Z-axis, there will still be no resulting output change from amplifier 23.

The output from amplifier 22 will change in the opposite polarity from that which was caused by movement of diode set 5 in the negative Y-axis direction relative to optical mask 10. This resulting change in the output of amplifier 22 is also a directly proportional and linear electrical analog of the positive Y-axis displacement of diode set 5.

The Y-axis direction of relative movement is the movement the transducer is designed to measure. It is designed to be insensitive to relative movements in the X and Z directions and to be insensitive to other variations caused by temperature changes.

Unlike other optical systems designed to measure the relative movement of light energy across a photosensitive device, the present invention does not require a concurrent relative movement between the optical mask 10 and the LED light source 6. Since the LED and the optical mask are fixed in position relative to each other, only the movement of the photosensitive device in relation to the mask and LED is measured. This eliminates the effect of positional variations of the light energy from the LED light source and obtains the maximum linearity and sensitivity. Since the movement of the photodiode 5 in the Y-axis direction relative to the mask and LED is a linear function of the load imposed on the load bearing beam 1, the electrical output of amplifier 22 is also a linear function of this load. The output of amplifier 22 is connected to a digital processing unit 25 where the output of amplifier 22 is converted to digital form for a digital display and signal processing for output to a computer over any of the standard data buss formats or to a radio frequency transmitter for data transmission to remote computer locations. The output of amplifier 22 can be calibrated to indicate the load on beam 1 or the strain in beam 1 or the deflection of beam 1 in any MKS or English units as required.

FIG. 7 shows diagrammatically that the optical mask 10 is constructed such that the shadow cast by the parallel beam 4 strip section between the aperture slots extends beyond the diode set 5 in the +X-axis and -X-axis directions, as does, to the same extent, the illuminated areas caused by the aperture slots. The illuminated areas also extend beyond the diode set in the +Y-axis and −Y-axis directions. In this condition, any relative movement between the diode set 5 and the optical mask 10 in the +X-axis or −X-axis directions only moves the diodes along the long dimension of the shadow which is constant and thus causes no change in the illuminated or shadowed areas of the diodes and therefore no output change from either amplifier 22 or amplifier 23.

The functions of diode 13 and diode 14 and amplifier 23 are designed to compensate for relative movement between diode set 5 and optical mask 10 along the Z-axis as well as temperature variations that occur in the photodiodes and the LED. The light energy from LED 6 is transmitted to the photodiode set 5 in the Z-axis direction.

Since the light energy from an LED is not collimated, the ratio of shadowed area to illuminated area of diodes 13, 14, 15 and 16 is dependent on the distance between the optical mask 10 and the diode set 5 along the Z-axis. If the distance between the diode set 5 and the optical mask 10 increases, the shadowed area increases. If this distance decreases, the shadowed area decreases. This does not cause a differential change in the outputs between diode 13 and diode 14 or between diode 15 and diode 16. But, it does cause a change in the absolute output from each diode, and therefore a change in the sum of the outputs from diode 13 and diode 14 as well as a change in the sum of the outputs from diode 15 to diode 16.

Since these relative Z-axis movements do not cause differential outputs from diode 15 and diode 16, there is no direct output change from differential amplifier 22. To the extent that amplifier 22 is truly differential, these relative Z-axis movements are not harmful, i.e., they do not affect the accuracy of the transducer output. However, no differential amplifier is perfectly differential and will exhibit a small output change even if its inputs are commonly and perfectly equally changed. The output of amplifier 23 is therefore used to drive the LED 6 to a higher intensity output when the shadowed area on the diodes 13, 14, 15 and 16 increases and to a lower intensity output when the shadowed area on these diodes decreases. In this way these changes in the common output of the photodiodes is divided by the gain of amplifier 23, which can be on the order of $10^6$ so the effect on the system will be negligible.

The summed input to amplifier 23 operates with respect to a temperature compensated reference 24. Thus, amplifier 23 also compensates for any temperature-related variations in photodiodes 13, 14, 15 and 16 and also in LED 6 because it divides any common variation in these components by $10^6$ which makes these common variations negligible.

Figure 8:
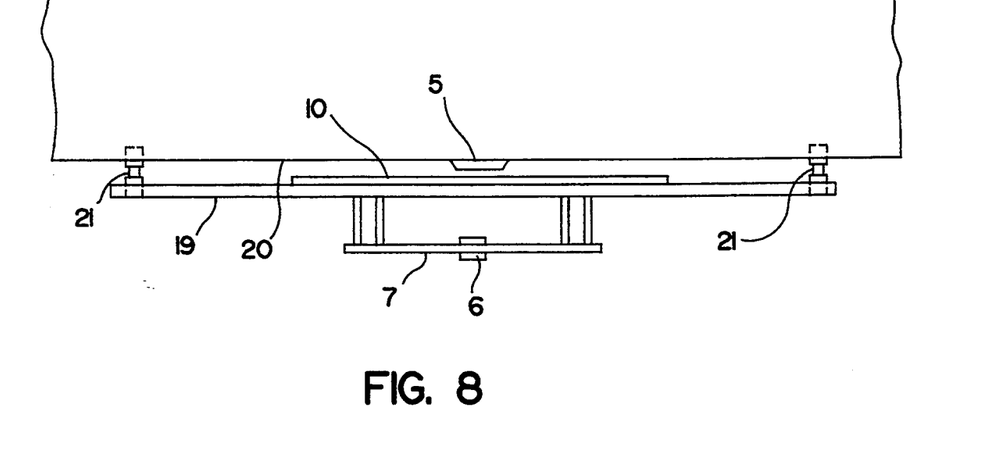
FIG. 8 is an enlarged view illustrating the parallel beam sensor structure of the invention applied to a load-bearing beam of indeterminate length such as, by way of example, a structural member of a material handling vehicle.

This electromechanical device is designed to measure the stress in a loaded beam and any strain that results therefrom. The beam as described herein is applicable as a stand-alone load cell or force transducer used to measure an external load such as a weight. FIG. 8 shows how the parallel beam concept discussed above can be applied to a beam of any length by attaching parallel beam 19 to beam 20 with flexible torsion bars 21. Beam 20 thus could be a structural member of a truck wherein the parallel beam system would be used to measure the weight of the load borne by the truck. Beam 20 could also be a structural member of an aircraft or railcar used for determination of weight and/or balance. Beam 20 could also be a structural member of a bridge or a building. In any of these applications, the system can be electronically calibrated to indicate stress in the member, the resulting strain in the member, or the load on the member in either English or MKS units.

FIGS. 10, 11 and 12 illustrate a practical implementation of the parallel beam concept to measure the tension in a cable or a chain. This is a load cell transducer configured with two load bearing beams. Upper beam 26 is fitted with torsion bars 27 and a pair of mutually facing non-load-bearing parallel beams 28 cooperating with complementary photodiode sets 5 on the load beam 26. Parallel beams 28 are fitted with single aperture masks 29, and LED'S 6 on LED support plates 7 as described in relation to FIG. 1. In this configuration the torsion bars 27 are cylindrical rods clamped into "V" grooves 30 with clamp plates 31. After the torsion bars 27 are clamped into the "V" grooves 30, the parallel beams 28 can be press-fitted onto them through holes 32, or the holes 32 may be countersunk and fastened to the torsion bars as shown in FIG. 11. Flathead screws 33 are inserted through holes in the parallel beam that are countersunk on the inside of the parallel beam such that a flat surface is provided for later mounting of aperture mask 29. LED 6 is bonded into diode plate 7 and the diode plate is then fastened to the parallel beam with screws 33 through spacers 34. The mounting tabs on aperture mask 29 are fixed into elongated holes 35 in the parallel beam to retain the mask immovable in relation to the parallel beam 28.

Photodiode sets 5 are bonded to upper beam 26 at the neutral Z-axis as shown. The functions of the parallel beam, the LED and the photodiode sets is the same as those described in relation to FIG. 1 and in the interest of brevity are not repeated. This transducer is designed to measure forces or weights applied to it in the "Y" direction at it's center at boss 36 (FIG. 12).

Bearing channel 37 is machined into upper beam 26 and bearing channel 38 is machined into lower load-bearing beam 39. These channels are designed to mate with roller bearing 40. In operation, the upper beam and the lower beam are separated with the only contact between them provided through roller bearings 40. The beams are designed to be assembled and applied as shown in FIG. 12. Anchor bolt 41 can be the anchor device for a cable on a material handling vehicle such as a crane or a chain or a forklift. The anchor bolt is free-floating through the center hole 42 in beam 26 and hole 43 in beam 39 and also through the hole in structural member 44 which is part of the crane or forklift.

The tension "T" in anchor bolt 41 thus causes both upper beam 26 and lower beam 39 to be compressed against structural member 44. This compressive stress is concentrated at the center of upper beam 26 by boss 36. The two load-bearing beams thus react against each other through roller bearings 40. In this configuration upper beam 26 is a simply supported, transversely loaded beam that exhibits a center deflection as described in relation to FIG. 4. Each parallel beam 28 again keeps the LED and the aperture mask in a stationary position relative to the associated photodiode set 5 on beam 26, and thus the photodiodes provide an electrical output that is proportional to the tension "T" which in turn is a function of the load borne by the vehicle. Beam 26 is designed with tapered side surfaces from near the center to each end. This results in uniform strain in the beam from end-to-end which allows the beam to be shorter than a uniform cross-section beam for any given design. The design of the transducer may therefore be smaller and more compact.

Figures 13, 13A:
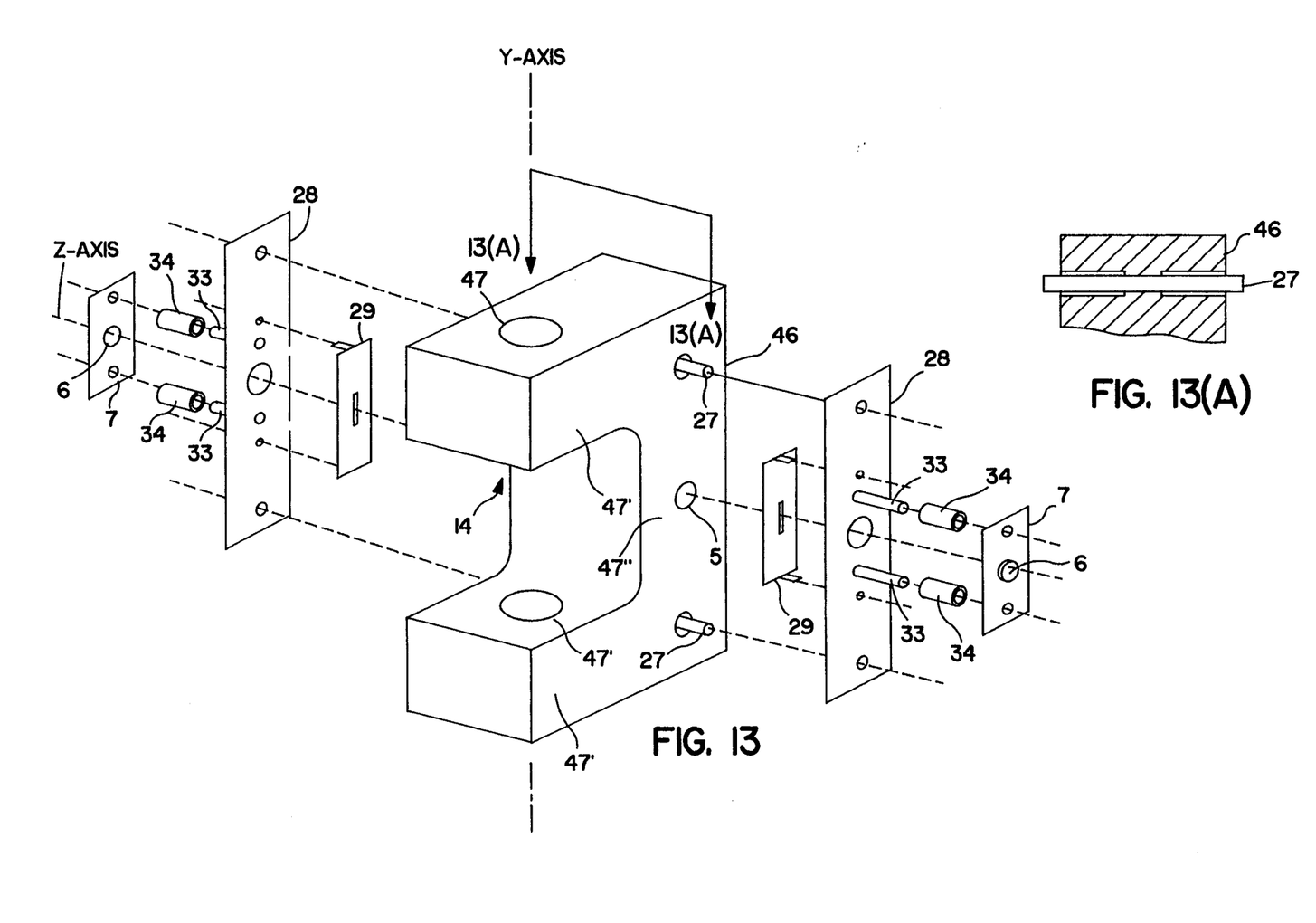
FIG. 13 is an exploded perspective view of a third embodiment constituting a load cell transducer for measuring loads applied in opposite directions.
FIG. 13(A) is a fragmentary vertical sectional view taken in the plane indicated by the line 13(A)—13(A) in FIG. 13.
Figure 14:
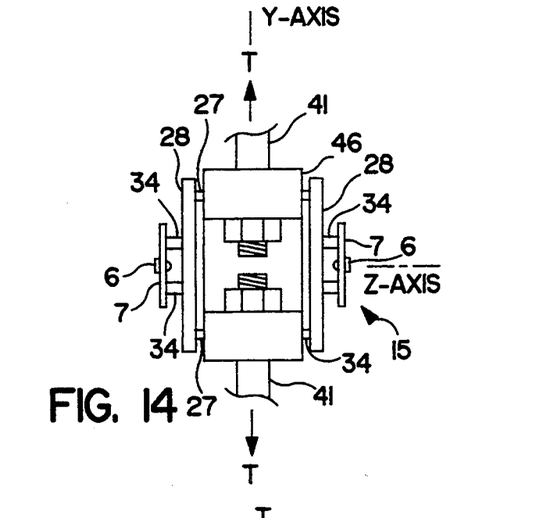
FIG. 14 is an elevational view taken in the direction of the arrow 14 in FIG. 13 and illustrating the load cell transducer of FIG. 13 assembled and mounted on opposing anchor bolts.

FIGS. 13 and 14 illustrate a single piece generally U-shaped transducer 46 designed to measure forces applied to it through aligned holes 47 in arms 47', which extend integrally cantilever-fashion from the base portion 47" of the transducer. These forces could be the tensions "T" applied through anchor bolts 41 as shown in FIG. 14. The function of transducer 46 can be best understood by reference to FIG. 16 which is an exaggerated schematic representation of the deflections that occur in the transducer when it is stressed as shown in FIG. 14.

Figure 16:
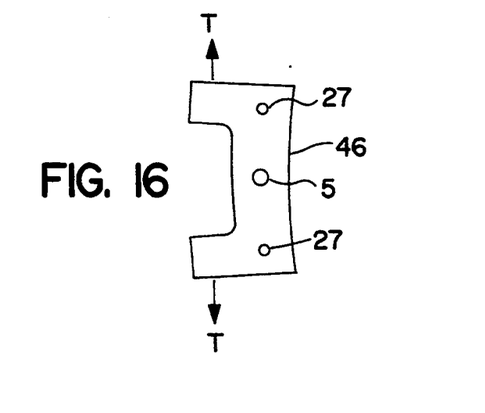
FIG. 16 is a fragmentary side elevational view illustrating the type of strain that occurs in the load cell transducer of FIGS. 13 and 14 upon the application of forces in opposite directions.

FIG. 16 shows that the section 47" between the torsion bars 27 is subjected to a bending moment and is deflected in an arc. The system of parallel beams and electro-optical components measure this deflection as described in relation to FIG. 1 and provide an electrical output that is proportional to the load "T". The system is symmetrically double-sided so that the outputs of the two photodiode sets can be added at the input of differential amplifier 22 for increased sensitivity.

FIG. 13(A) shows how transducer block 47" is internally machined to provide a press fit for torsion bars 27. This internal press fit is machined at the neutral Z-axis of the beam sections of the transducer block so only torsion stresses are transferred to the torsion bars. The short press fit section also allows the major part of the torsion bars to be free-floating, which enhances the function of the torsion bars in this application.

Figure 15:
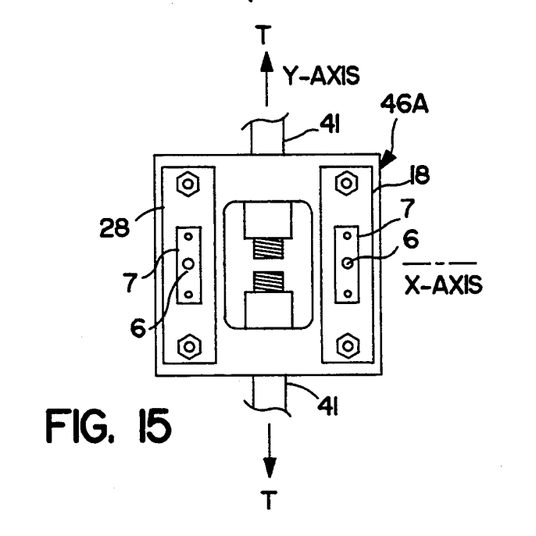
FIG. 15 is a side elevational view of the embodiment illustrated in FIG. 14, modified by interconnection of the free ends of the arms and taken in the direction of the arrow 15 in FIG. 14.

FIG. 15 shows how the basic U-shaped transducer concept of FIG. 13 can be extended or expanded to a continuous symmetrical unit with four parallel beam systems (two shown) for even greater sensitivity by integrally interconnecting the ends of the arms 47".

Figures 17, 18:
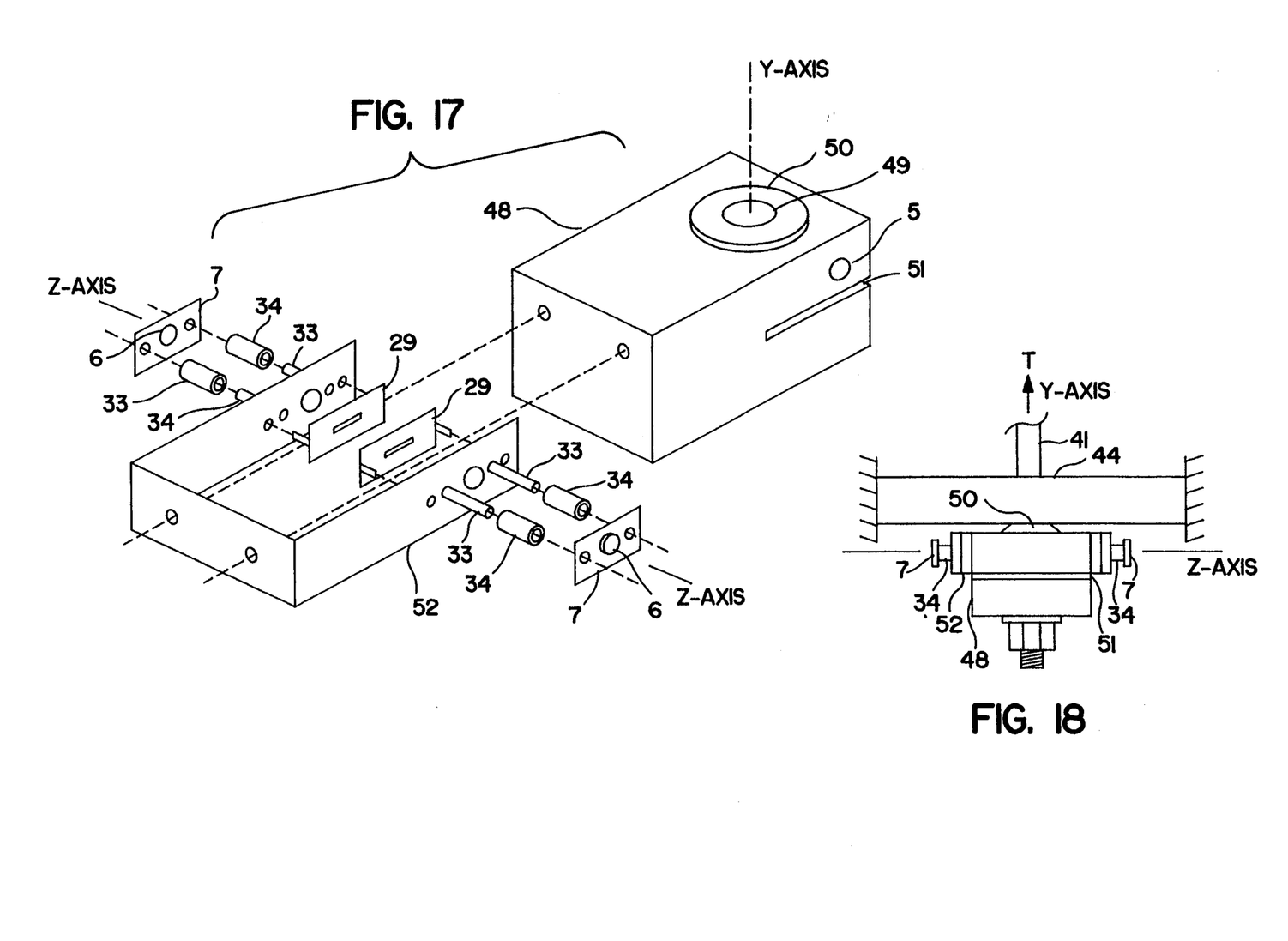
FIG. 17 is an exploded perspective view of a fourth embodiment incorporating my load cell invention, incorporating parallel beams without torsion bars.
FIG. 18 is an elevational view of the load cell transducer embodiment of FIG. 17 shown assembled and mounted in operative position to measure the tension on an anchor bolt or cable.

FIG. 17 shows the implementation of a parallel beam transducer concept without torsion bars. The load bearing element 48 is machined from a solid metal block with hole 49 and boss 50 to accommodate an anchor bolt as described in relation to FIG. 12. Slot 51 is cut approximately halfway through the block as shown. This forms two beams 53 and 54 that act as cantilever beams when the block is stressed as shown in FIG. 18, which is the same configuration described in relation to FIG. 12. The cantilever beams transfer internal stresses to the uncut portion of the block that decrease significantly with distance from the slot toward the surface opposite the slot.

The parallel beam 52 for this application is formed in one piece as a generally U-shaped member and mounted by appropriate screws (not shown) on the surface 48' of the load bearing block opposite the slot as shown in FIG. 17. This surface is unstressed so the block-embracing parallel beam assembly provides a stable platform relative to the deflection of the cantilever beams 53 and 54.

Photodiode set 5 is mounted on the cantilever beam 54 adjacent to the embracing parallel beam assembly such that the parallel beam assembly and the electro-optical components measure the deflection in beam 54 as described in relation to FIG. 1 and provide an electrical output that is proportional to the load "T".

Any of the transducers described here may be machined appropriately and connected electrically to operate as compression load cells. The transducers shown in FIGS. 10 and 17 are designed with precision spacing between their flexible load bearing elements so that these elements contact each other at the maximum design load and further flexure in these elements is precluded. In this condition, the stress on the transducer is a simple P/A stress so the transducer acts as a washer and can withstand stresses far beyond the capability of the machine for which it is designed.

Having thus described the invention what is believed to be new and novel, and sought to be protected by letters patent of the United States is as follows.

I claim:

1. The method of effecting measurement of the magnitude of an applied force to a structural member which may have an indeterminate length, comprising the steps of:

a) mounting a first beam having X, Y and Z axes in cooperative association with said structural member whereby a force applied to said structural member in the direction of said Y-axis is applied also to said first beam in a manner to effect deflection thereof in the direction of said Y-axis in proportion to the force applied;

b) arranging a second beam parallel to the X-axis of said first beam and spaced from said first beam in the direction of said Z-axis;

c) causing opposite end portions of said second beam to be secured to corresponding opposite end portions of said first beam in a manner whereby said second beam is non-responsive to deflection of said first beam;

d) causing the relative deflection between said first and second beams to generate an electrical signal that is an analog of the force applied to said first beam and the deflection caused thereby; and e) utilizing said signal to effect indication of the magnitude of the force applied to said first beam.

2. The method according to claim 1, wherein said X and Z axes lie in a common plane, and said Y-axis is perpendicular to said X and Z axes at the intersection thereof.

3. The method according to claim 1, wherein said Z-axis when extended penetrates the geometric center of said second beam.

4. The method according to claim 1, wherein said analog signal is converted to an equivalent digital signal, and said digital signal is utilized to effect indication of the magnitude of the force applied to said first beam.

5. The method according to claim 1, wherein said first beam constitutes a generally monolithic body having spaced top, bottom, front and rear surfaces intercepted by spaced end surfaces, said monolithic body having a geometric center at the intersection of said X, Y, and Z axes, said second beam is caused to be connected to the end surfaces of said first beam by weak torsion members exhibiting a small couple on the associated ends of said second beam when said first beam is deflected, and said second beam is caused to be resistant to bending in the plane of said couples whereby said second beam resists displacement when said first beam is deflected by an applied force.

6. The method according to claim 1, wherein a set of a plurality of optically sensitive photodiodes are mounted on said first beam symmetrical with said Z-axis, an optical energy source is mounted on said second beam and arranged to selectively transmit light energy in the direction of said Z-axis toward said optically sensitive photodiodes to effect proportional illumination thereof, and arranging a stationary optical mask having at least one aperture in the path of said light energy to control the dispersal of light on said photodiodes, whereby relative deflection between said first and second beams results in disproportional dispersion of light on said photodiodes and generation of said electrical signal proportional to the deflection of said first beam.

7. The method according to claim 6, wherein said optical mask is mounted on said second beam and disposed between said second beam and said photodiodes.

8. The method according to claim 6, wherein said second beam is provided with an aperture having an axis coincident with said Z-axis and said optical energy source is mounted on said second beam in a manner to transmit light energy through the aperture in said second beam and toward said photodiodes, and said optical mask is mounted on said second beam on the side thereof opposite said source of light energy whereby light passing through said aperture in said second beam passes through the aperture in said mask to reach said photodiodes.

9. An electro-mechanical transducer for measuring the magnitude of a load force or weight applied to a structural member to which the transducer is attached, comprising:
   a) a load-bearing first beam having X, Y and Z axes adapted for attachment to said structural member and operative to exhibit a controlled strain in response to a load force thereon applied in the direction of said Y axis and derived from said structural member;
   b) a non-load-bearing second beam parallel to the X-axis and mounted on said load-bearing first beam in a manner whereby said non-load-bearing second beam is precluded from exhibiting a strain as a result of the load force applied to said load-bearing first beam;
   c) a source of light energy mounted on the non-load-bearing second beam and selectively operable to transmit a predetermined pattern of light energy to impinge on a surface of said load-bearing first beam;
   d) optical light sensor means operatively mounted on said surface on which said light energy impinges on said load-bearing first beam symmetrical with said Z-axis and adapted to intercept light energy transmitted from said source thereof mounted on said non-load-bearing second beam and operable to provide an electrical output that varies in response to movement of the optical sensor means relative to the predetermined light pattern from said source thereof as a force is applied to said load-bearing first beam; and
   e) electronic circuit means operable to accept the electrical outputs from said optical sensor and effect an indication of the magnitude of the force imposed on said load-bearing first beam.

10. The electro-mechanical transducer according to claim 9, wherein said load-bearing first beam comprises a monolithic body having spaced top, bottom front and back surfaces intercepted by spaced end surfaces, said non-load-bearing second beam lies parallel to and spaced from at least one surface of said load-bearing beam, and weak torsion means interconnect corresponding adjacent ends of said first and second beams in a manner whereby said second beam resists displacement when said first beam is deflected by an applied force.

11. The electro-mechanical transducer according to claim 9, wherein said non-load-bearing second beam is provided with an aperture symmetrical with respect to said Z-axis, said source of light energy is mounted on said second beam on the side thereof remote from said first beam whereby light energy from said source thereof is transmitted through said aperture and impinges on said light sensor means to provide said electrical output.

12. The electro-mechanical transducer according to claim 9, wherein said optical light sensor comprises a plurality of optically sensitive photodiodes mounted on said first beam symmetrical with respect to said Z-axis and adapted to receive light energy from said source thereof to effect proportional illumination of said plurality of optically sensitive photodiodes prior to application of a load force on said first beam.

13. The electro-mechanical transducer according to claim 9, wherein said optical light source comprises a light emitting diode, said optical light sensor means comprises a set of optically sensitive photodiodes symmetrical with respect to said Z-axis and including a first pair of photodiodes spaced above said Z-axis a predetermined distance and a second pair of photodiodes spaced below said Z-axis the same predetermined distance, one each of the photodiodes of each pair thereof spaced to the left of said Z-axis and the remaining photodiode of each pair spaced to the right of said Z-axis whereby light energy impinging on each said photodiode generates an electrical output signal, and said electronic circuit means includes a differential amplifier having a signal inverting input terminal connected to one of said photodiodes of said first pair thereof that lies to the right of said Z-axis and a non-inverting input terminal connected to one of said photodiodes of said second pair thereof that lies to the right of said Z-axis, a summing amplifier the input terminal of which is connected in common to the other diode of each pair that lie to the feft of said Z-axis, and means for receiving the output from said differential amplifier and operable to produce an indication of the load force applied to said first beam.

14. The electro-mechanical transducer according to claim 13, wherein said means for receiving the output from said differential amplifier comprises a digital processing unit where the output from said differential amplifier is converted to digital form, and said indication of the load force comprises a digital display of the load force.

15. The electro-mechanical transducer according to claim 13, wherein the output of the summing amplifier is connected to drive said light emitting diode, and one input of said summing amplifier is connected to a temperature compensator whereby said summing amplifier functions to compensate for temperature-induced variations in output from said photodiodes and said light emitting diode.

16. The electro-mechanical transducer according to claim 9, wherein said non-load-bearing second beam is provided with an aperture symmetrical with said Z-axis, said source of light energy is mounted on said second beam so as to transmit light energy through said aperture, and an optical mask having at least one aperture is mounted on said second beam on the side thereof opposite said source of light energy whereby light from said source passes through the at least one aperture of said mask to reach said optical light sensor means.

17. The electro-mechanical transducer according to claim 16, wherein a plurality of apertures are formed in said optical mask in symmetry with said Z-axis.

18. The electro-mechanical transducer according to claim 9, wherein a pair of mutually facing non-load-bearing beams are mounted on opposite sides of said first beam.

19. The electro-mechanical transducer according to claim 9, wherein said load-bearing first beam comprises a generally U-shaped monolithic body having a pair of spaced cantilever-like arms projecting integrally from a base, and at least one non-load-bearing beam is mounted on said base.

* * * * *